United States Patent
Lin et al.

(10) Patent No.: US 7,366,473 B2
(45) Date of Patent: Apr. 29, 2008

(54) METHOD AND APPARATUS FOR DIVERSITY SWITCHING CONTROL

(75) Inventors: Xintian E. Lin, Palo Alto, CA (US); Qinghua Li, Sunnyvale, CA (US); Allen W. Bettner, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 625 days.

(21) Appl. No.: 10/835,296

(22) Filed: Apr. 28, 2004

(65) Prior Publication Data

US 2005/0243773 A1 Nov. 3, 2005

(51) Int. Cl.
*H04B 1/00* (2006.01)
*H04B 15/00* (2006.01)

(52) U.S. Cl. ........................ 455/63.4; 455/25; 455/101; 455/120; 455/121; 455/193.1; 455/68; 455/129; 455/83; 455/87; 455/127.1; 455/277.1; 455/550.1; 455/560; 455/343.1; 342/367; 342/372; 342/374

(58) Field of Classification Search ................ 455/25, 455/63.4, 82, 556.1, 556.2, 562.1, 101, 129, 455/120–121, 193.1–193.2, 269, 272, 276.1, 455/277.1–277.2, 83, 97, 575.7, 418–420, 455/68–69, 63.1, 557, 559–561, 572, 574, 455/123–124, 127.1, 5, 84–87, 550.1, 343.1; 342/350, 375.1, 367–368, 372–377

See application file for complete search history.

(56) References Cited

U.S. PATENT DOCUMENTS 6,332,071 B1 * 12/2001 Brandt ..................... 455/82
6,353,406 B1 * 3/2002 Lanzl et al. .............. 342/118
6,915,120 B2 * 7/2005 Ichihara ..................... 455/129

FOREIGN PATENT DOCUMENTS

| DE | 196 03 514 A1 | | 8/1997 |
| EP | 1 035 659 A | | 9/2000 |
| WO | WO 03/034614 | * | 4/2003 |
| WO | WO 03-034614 A1 | | 4/2003 |

OTHER PUBLICATIONS

Gore D et al: "Statistical MIMO antenna sub-set selection with space-time coding" IEEE ICC 2002. New York, NY, Apr. 28-May 2, 2002. vol. 1, pp. 641-645 XPO10589572.
Heath R W et al: "Antenna selection for spatial multiplexing systems based on minimum error rate" ICC 2001. NY, NY: IEEE, US, vol. 1, Jun. 11, 2001, pp. 2276-2280 XPO10553722.
Gorokhov A et al: "Performance bounds for antenna selection in MIMO systems" ICC 2003. New York, NY, May 11, 2003, vol. 1, pp. 3021-3025 XPO10643001.

* cited by examiner

*Primary Examiner*—Tuan Tran
(74) *Attorney, Agent, or Firm*—Kacvinsky LLC

(57) ABSTRACT

A method and apparatus for diversity switching control are generally described herein. According to one embodiment, a diversity control network is introduced which effectively reduces the number of coaxial cables required to interface with N antennas from the conventional N cables, to N/2 thereby providing significant cost saving.

14 Claims, 4 Drawing Sheets

METHOD AND APPARATUS FOR DIVERSITY SWITCHING CONTROL

TECHNICAL FIELD

Embodiments of the invention are generally directed to wireless communication systems and, more particularly, to a method and apparatus for diversity switching control.

BACKGROUND

The use of multiple antennas in wireless communications devices is becoming increasingly popular. The introduction of non-correlated spatial diversity through the use of multiple antennas often provides improvements in channel gain and throughput. One of the detriments of conventional techniques for implementing multiple antennas, however, is the increased component cost associated with the multiple transmit and receive chains.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Embodiments of a method and apparatus for diversity switching control are generally introduced. According to one embodiment, a diversity control network is introduced which effectively reduces the number of coaxial cables required to interface with N antennas from the conventional N cables, to N/2 thereby providing significant cost savings. As developed more fully below, the diversity control network dynamically switches the transceiver (e.g., transmitter and/or receiver) chains to an appropriate one or more antenna(e).

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
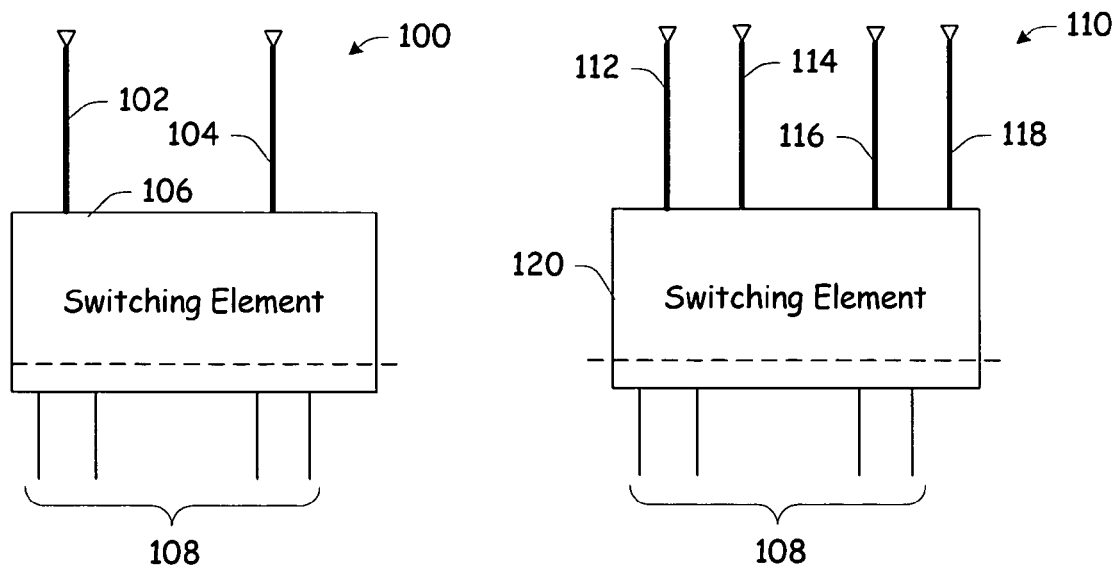
FIG. 1 is a block diagram of a conventional antenna networks.

FIG. 1 is a block diagram of two conventional antenna interface architectures 100 and 110, respectively. With reference to architecture 100, two antenna elements are coupled to a switching element 106 via two coaxial cables 102 and 104, respectively. The switching element 106 selectively routes content from a select one of the two antennas to the communication device (not particularly shown, although it may embody the switching element 106) via a select 1 of the 4 transmit and receive lines 108, as shown. Of note, is that the number of coaxial cables coupling the antennas to the multiplexer is equal to the number of antennas (N), in this case 2.

Similarly, with reference to architecture 110, four antenna elements are coupled to switching element 120 using an associated four coaxial cables 112, 114, 116 and 118, respectively. Again, the switching element 120 routes content from any of the four antenna elements to any of the four transmit and receive lines 108 within the front-end of the communication device (not particularly denoted). Again, of note, is that the number of coaxial cables coupling the antennas to the multiplexer is equal to the number of antennas. As provided above, the architectures of FIG. 1 represent a costly solution.

Figure 2:
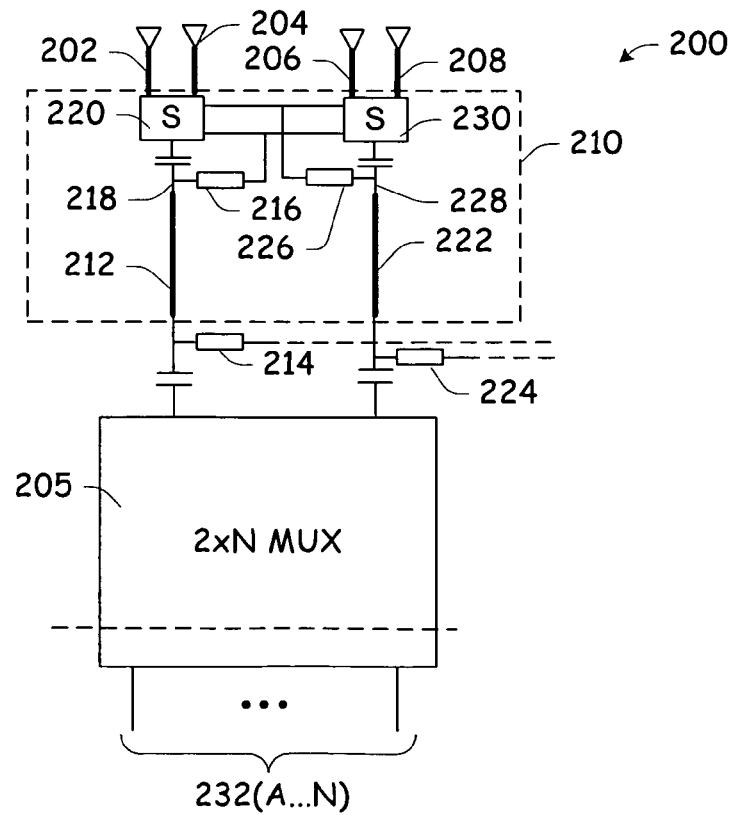
FIG. 2 is a block diagram of an example diversity control network, according to one embodiment of the invention.

Turning to FIG. 2, a more economical solution is depicted within the block diagram illustrating an example embodiment of a diversity control network, according to one embodiment of the invention. As shown, four antenna elements 202, 204, 206 and 208 are coupled to a multiplexer 205 (or, alternatively, one or more switches) via an innovative diversity control network 210. As shown, the innovative diversity control network 210 couples the (N) antenna elements to the multiplexer 205 using (N/2) coaxial cables, thereby significantly reducing the cost of implementing a multi-antenna architecture. For ease of explanation, and not limitation, the detail of the example diversity control network 210 will be described in the context of a 4-antenna system, although the scope of the invention is not limited in this regard.

As shown, the diversity switching path consists of two primary processing paths, one each associated with the two coaxial cables 212 and 222, respectively. As shown, such coaxial cables 212 and 222 are coupled to the multiplexer element 106 through capacitors (not particularly referenced, but illustrated in FIG. 2). With reference to the processing path associated with coaxial cable 212, antenna elements 202 and 204 are coupled to the center conductor of cable 212 through a switch element 220. According to one embodiment, the switch element 220 may be a single-pole, double throw (SPDT) switch element, although the scope of the invention is not limited in this regard.

The switch element 220 is coupled to the center conductor 218 of cable 212 through a capacitor element (not particularly referenced, but illustrated within FIG. 2). The center conductor of the cable 212 is then coupled to an input/output port of the multiplexer 205 though another capacitor element (again, not particularly referenced, but duly illustrated within the FIG.).

The processing path for the other antenna elements 206 and 208 mirrors that of the other processing path, introduced above. The antenna elements 206 and 208 are selectively coupled to the center conductor 228 of cable 222 through a switching element 230. According to one embodiment, an SPDT switch element may well be used, although the invention is not limited in this regard.

As shown, each of the switches are interconnected with control lines, each coupled through a choke 216 and 226 to the center conductor of cables 212 and 222, respectively. Similarly, control lines (dashed lines coupled to elements 214, 224, respectively) are coupled to the center conductor of each cable 212, 222 through chokes 214 and 224, respectively. According to one embodiment, the chokes 214, 216, 224 and 226 may be replaced by a resistor appropriately sized based on the switching element 220, 230 employed. According to one embodiment, one or both of switching elements 220 and 230 may be implemented using MACOM 0113 SPDT switches, wherein a choke 214, 216, 224, 226 of a 10 K Ohm resistor would be sufficient. According to one example embodiment, elements 216, 220, 226 and 230 may be referred to as a diversity switch network.

As introduced above, the center conductor pins of the coaxial cables 212, 222 may be used to pass the control information and still keep the "passive" nature of the network. According to one embodiment, the multiple control inputs (in the illustrated example, two control inputs) provide complementary input signal(s) to the center conductors coupled with the switches 220, 230. As shown, each of the control inputs are provided to each of the switches 220, 230, although the invention is not limited in this regard. In the example embodiment, providing two or more of the complementary control input to each of the switches 220, 230 provides the requisite power and control to enable the switches to function. That is, according to one aspect of an embodiment of the invention, the network is passive in that the switching elements 220 and 230 do not need to be powered by external power (e.g., Vdd).

According to one example embodiment, the control lines go through a choke 214, 224 to avoid interfering with the RF lines, e.g., to avoid RF power being applied to a control element. According to one embodiment, an external control element (e.g., within the transceiver or host device) issues control signals (e.g., analog or digital signals) to control which antenna the switch is selectively coupled. According to one embodiment, the control lines coupled with each of the cables 212, 222 are complementary, wherein the control of each of the switches 220, 230 is performed in concert with one another, although the invention is not limited in this regard.

Having introduced an example diversity control network architecture in accordance with one embodiment of the invention, attention is drawn to Table 1, below, which evidences the cost savings achieved according to one embodiment of the innovative diversity control network.

menting the diversity control network is roughly one-half the cost addition of conventional techniques.

Figure 3:
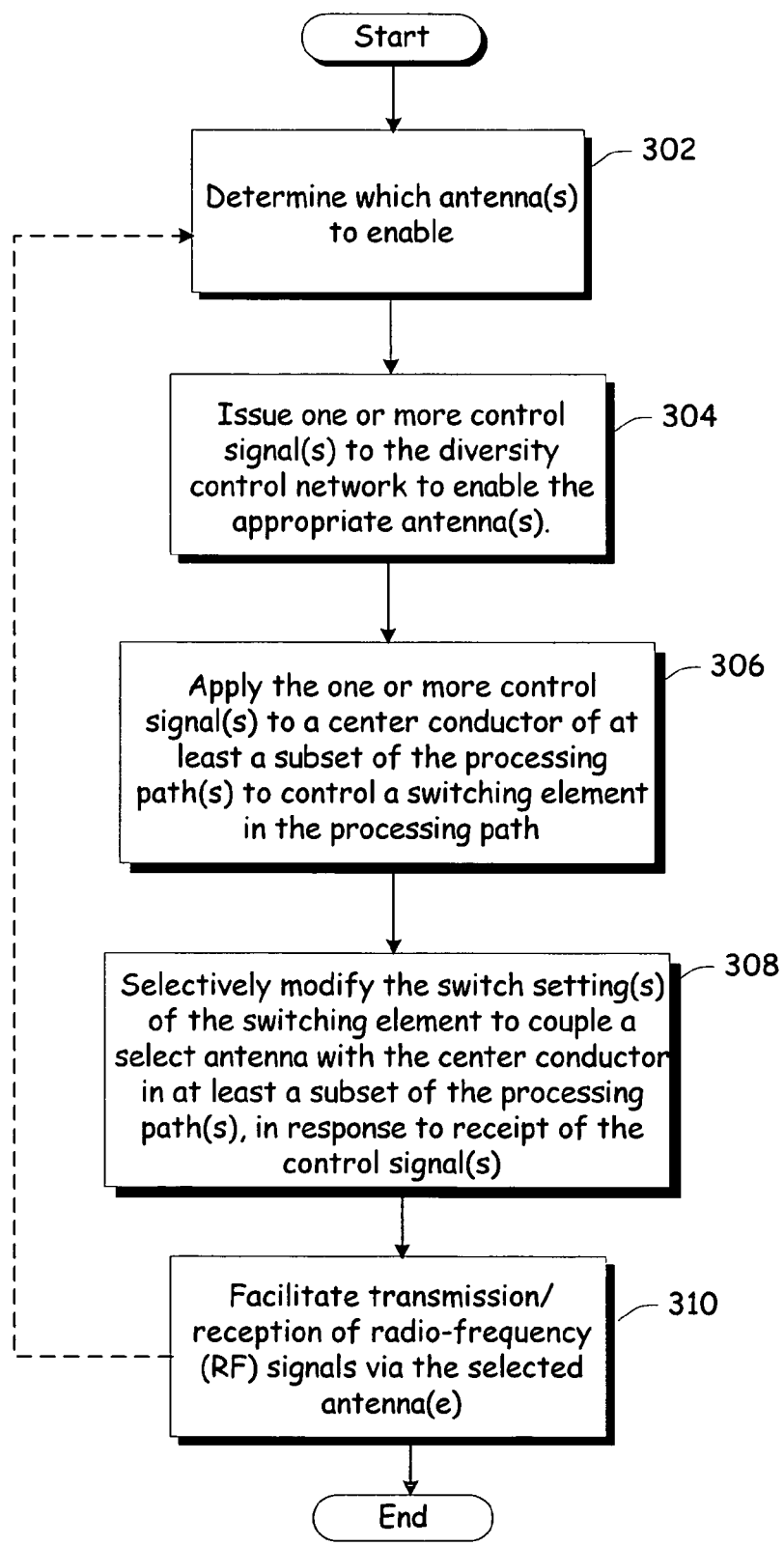
FIG. 3 is a flow chart of an example method of dynamically switching between multiple antennas, according to an embodiment of the invention.

Turning to FIG. 3, an example method for utilizing the diversity control network is presented, according to one example embodiment. In accordance with the illustrated example method 300 of FIG. 3, the process begins with block 302, wherein a determination is made of which antenna(e) 202, 204 and 206, 208 to use. As introduced above, this determination could be made by a transceiver (not particularly denoted) coupled with, or hosting the diversity control network 210, or it may be made by a control element within a host electronic device (e.g., cell phone, personal digital assistant, laptop computer, etc.).

In response to the determination, the appropriate control element issues one or more control signal(s) to the diversity control network, block 304. More specifically, according to one embodiment, the control element (either within an associated transceiver, or host device) places a direct current (DC) bias of zero (0) volts or some non-zero voltage (e.g., within a range of 2.9 to 5 Vdc for MAcom 0113 SPDT) to control the switch position of the switching elements 220, 230 within the diversity control network 210, although the invention is not so limited. The bias can be DC or a slow varying signal.

In block 306, the diversity control network 210 receives the control signal(s) via control lines, and applies the control signal(s) to the center conductor(s) 218, 228 of the processing paths through choke elements 214, 224.

In block 308, the switching elements 220, 230 receive the control signal(s), or a representation thereof, via the center conductor 218, 228, and selectively modify the switch settings to couple a select antenna 202 or 204 and 206 or 208 with a center conductor 218 and 228, respectively. According to one embodiment, a DC bias of zero on 218 and non-zero (e.g. 2.9V) bias on 228 may close the respective switch 220, 230 and antenna 202 and 206 is selected, although the invention is not limited in this regard. Conversely, a non-zero DC bias on 218 and zero bias on 228 may open the respective switch 220, 230 and antenna 204 and 208 is selected, although the invention is not limited in this regard.

With the appropriate antennae selected, the diversity control network 210 facilitates the transmission/reception of, e.g., radio frequency (RF) signals via the selected antenna(e), block 310. As depicted with the dashed line, the process may well continue as long as the host communications device is in use, with a return to block 302 and a determination of which antennae should be employed next.

TABLE 1

COMPARISON OF DIVERSITY ANTENNA ARCHITECTURE COSTS

| | switch cost | coaxial cable | antennas | inverter | passive | Incremental over 1.a | compatible with 1.a | passive powered |
|---|---|---|---|---|---|---|---|---|
| 1.a | 0.6 | 1.72 | 1.2 | 0 | 0 | 0 | | Y |
| 1.b | 1.3 | 3.44 | 2.4 | 0 | 0 | 3.62 | N | Y |
| 1.e | 1.2 | 1.72 | 2.4 | 0 | 0.03 | 1.83 | Y | Y |

Figure 4:
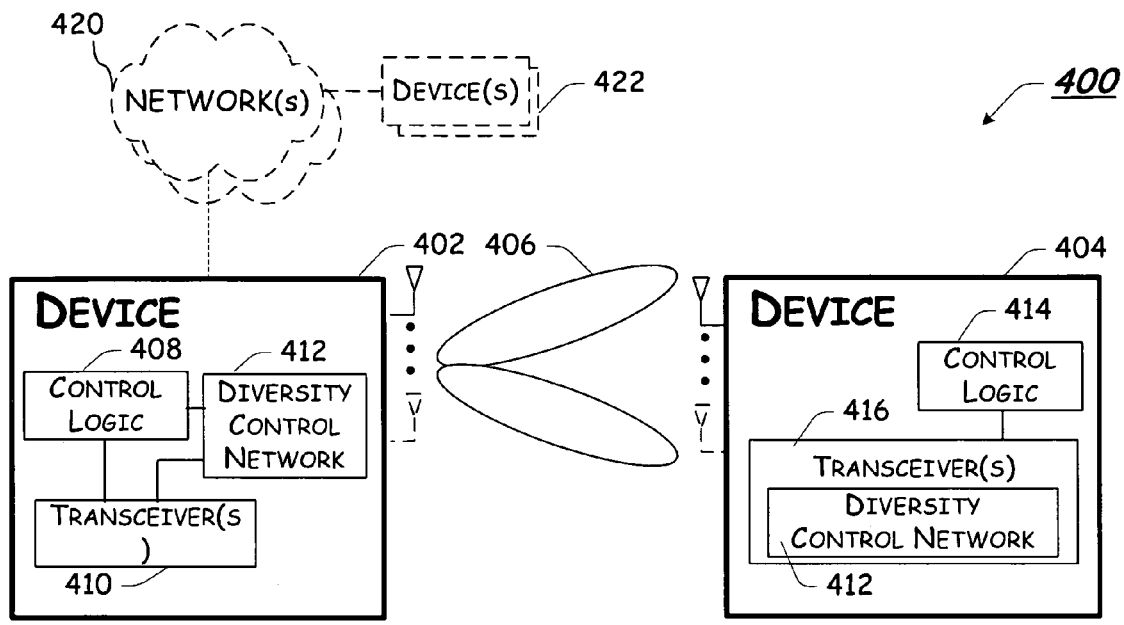
FIG. 4 is a system diagram of a communication network wherein one or more devices within the network utilize one or more embodiments of the diversity control network, according to one example embodiment.

In Table 1, row 1.a, refers to architecture 100, while row 1.b is associated with architecture 110 and row 1.e is associated with architecture 200. As shown, the incremental cost between the two, four-antennae implementations (110 and 200) evidences that even with the cost of the added switching elements 220, 230, capacitor elements and chokes 214, 216, 224 and 226, the cost of the architecture implementing Having introduced an example diversity control network architecture and method of operation, attention is now directed to FIG. 4, wherein a block diagram of an example communication system employing various embodiments of the diversity control network are depicted, according to one example embodiment. In accordance with the illustrated example embodiment of FIG. 4, network 400 is depicted comprising two electronic devices 402 and 404 each enabled for wireless communication via communication channel 406. According to one embodiment, device 402 is depicted coupled with one or more various other wireline or wireless networks 420, to enable communication with the devices 422 coupled thereto.

Device 402 is depicted comprising control logic 408, one or more wireless transceiver(s) (e.g., a combination of one or more transmitters and one or more receivers) 410 and a diversity control network 412, each coupled as depicted. In accordance with the embodiment of device 402, diversity control network 412 is an independent element, coupled with both control logic 408 of the host device as well as transceivers 410. To illustrate another embodiment, device 404 is depicted comprising control logic 414 coupled with transceiver 416 which includes an embodiment of diversity control network 412. In this regard, many alternate implementations of the diversity control network are anticipated by the disclosure herein. Regardless of the implementation, as introduced above, the use of diversity control network 412 provides a cost-effective means of reducing the number of coaxial cables required to implement multi-antenna wireless communication systems.

As used herein, electronic devices 402 and 404 are each intended to represent any of a wide variety of electronic appliances including, but not limited to, cellular telephones, personal communication devices, personal digital assistants (PDA), palmtop computers, laptop computers, tablet computers, personal gaming devices, and the like.

Similarly, communication network 400 is intended to represent any of a number of wireless communication systems including, but not limited to cellular telephone networks, wireless local area networks, wireless personal area networks, wireless metropolitan area networks, wireless wide area networks, and the like, although the scope of the invention is not so limited.

Figure 5:
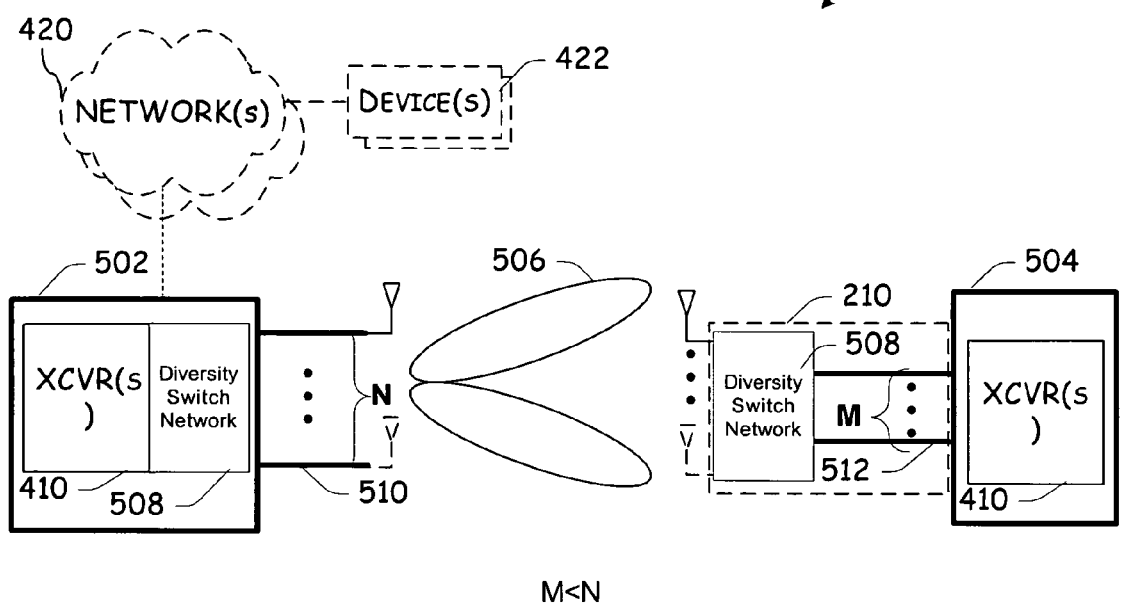
FIG. 5 is a system diagram of a communication network wherein one or more devices within the network utilize an alternate embodiment of the diversity control network, according to another embodiment of the invention.

Turning to FIG. 5, a block diagram of an example communication system incorporating multiple implementations of the diversity switch network, according to multiple embodiments of the invention. In accordance with the illustrated example embodiment, device 502 includes one or more transceiver(s) (XCVR(s)) 410 coupled with a diversity switch network 508 (e.g., elements 216, 220, 226 and 230) are implemented prior to a plurality (N) of coaxial cables 510 coupled with N antennae, to generate wireless communication channel 506.

Alternatively, device 504 is depicted comprising transceiver(s) 410 coupled with a plurality (M) coaxial cables 512 to the diversity switch network 508 and a plurality (P) of antenna(e). According to this implementation, the number of coaxial cables (M) required is P/2. It should be appreciated, given the description above, that the implementation of device 504 having diversity switch network 508 and P/2=M coaxial cables 512 is another illustration of diversity control network 210.

Alternate Embodiment(s)

Figure 6:
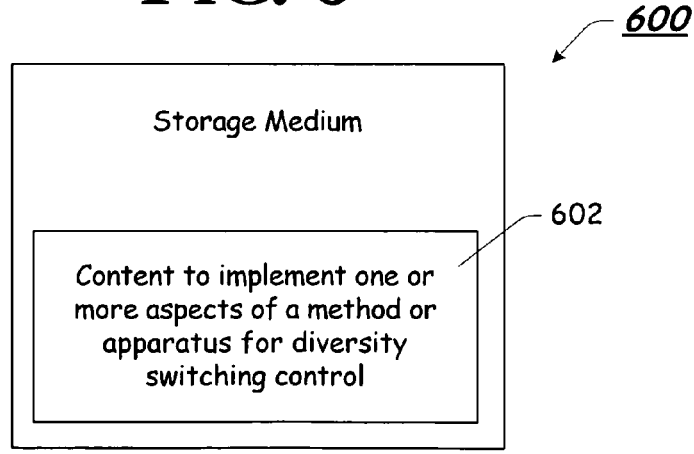
FIG. 6 is a block diagram of an example article of manufacture including content which, when executed by an accessing machine, causes the machine to implement one or more aspects of embodiment(s) of the invention.

FIG. 6 illustrates a block diagram of an example storage medium comprising content to implement one or more aspects of a method or apparatus for diversity switching control, according to one example embodiment. In this regard, storage medium 600 may include content 602 (e.g., instructions, data, or any combination thereof) which, when executed, causes an accessing appliance to implement one or more aspects of the diversity control network 210, described above.

The machine-readable (storage) medium 600 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect.

The types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, such as those shown in FIGS. 1 and/or 2, or may be embodied in machine-executable content (e.g., instructions) 602, which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. An apparatus comprising:
    N antenna elements; and
    a diversity control network, coupled to the N antenna elements, including N/2 signal processing paths that are dynamically coupled with a select subset of the N antenna elements in response to control input received via the signal processing paths to facilitate the transmission/reception of wireless signals, one or more signal processing paths of the diversity control network comprising:
    a switching element coupled with a subset of the N antenna elements, the switching element interconnected by one or more control lines with one or more additional switching elements;
    a coaxial cable, coupled with the switching element, and selectively coupled with one antenna of the subset of the N antenna elements in response to the received control input; and
    a control line, coupled with a center conductor of the coaxial cable, to receive control input from an external element, wherein the control input is applied to the switching element via the center conductor of the coaxial cable.

2. An apparatus according to claim 1, wherein N=4K, wherein K is a positive integer.

3. An apparatus according to claim 1, wherein the control line is coupled to the center conductor of the coaxial cable through a choke.

4. An apparatus according to claim 3, wherein the choke is a resistor element sized according to a type of switching element employed.

5. An apparatus according to claim 1, wherein the control lines are grouped, to provide a complementary set of control signals to drive the switching elements and maintain a passive nature of the diversity control network.

6. An apparatus according to claim 5, wherein the complementary set of control signals are direct current (DC) voltage bias, where a combination of zero volts and a nonzero volts closes a coupled switching element, while a different bias combination opens a coupled switching element.

7. A method comprising:
    receiving control input, comprising receiving control signals at a center conductor of a coaxial cable within each of processing paths of a passive diversity control network and passing the control signals to switching elements in each of the processing paths, said switching elements interconnected with one or more control lines; and
    selectively modifying one or more switching elements within the passive diversity control network in response to the received control input to effectively couple a subset of N antennae with N/2 signal processing paths of the diversity control network.

8. A method according to claim 7, wherein the control signals are received at the center conductor through a choke element and are grouped to power the switch without an external power source to preserve the passive nature of the diversity control network.

9. A method according to claim 7, wherein selectively modifying one or more switching elements comprising:
    receiving the control signal via the center conductor of the processing path at the switching element, and selectively modifying a switch setting in response thereto.

10. A method according to claim 9, wherein modifying the switching setting includes changing the switch from open to closed, or vice versa.

11. A method according to claim 10, further comprising:
    facilitating the transmission/reception of wireless communication signals via the processing paths selectively coupled to a subset of the N antennae.

12. A storage medium comprising content which, when executed by an accessing machine, causes the machine to selectively modify multiple switching elements within a passive diversity control network in response to received control inputs to effectively couple a subset of N antennae with N/2 signal processing paths of the diversity control network, said switching elements interconnected with one or more control lines;
    wherein the control inputs are received at a center conductor of a coaxial cable of each said processing path coupled with the switching element, the switching element selectively coupling a select one of the subset of N antenna to the processing path, to enable the transmission/reception of wireless communication signals via the select antenna.

13. A storage medium according to claim 12, wherein the control inputs are coupled to the center conductor through a choke and are grouped to self power the switch to preserve the passive nature of the diversity control network.

14. A storage medium according to claim 12, wherein the control inputs are direct current (DC) bias of either zero volts or non-zero volts.

* * * * *

UNITED STATES PATENT AND TRADEMARK OFFICE
CERTIFICATE OF CORRECTION

PATENT NO. : 7,366,473 B2 Page 1 of 1
APPLICATION NO. : 10/835296
DATED : April 29, 2008
INVENTOR(S) : Lin et al.

It is certified that error appears in the above-identified patent and that said Letters Patent is hereby corrected as shown below:

In column 8, line 10, in Claim 7, after "network" insert -- , --.

In column 8, line 36, in Claim 11, delete "a" and insert -- the --, therefor.

In column 8, line 49, in Claim 12, delete "antenna" and insert -- antennae --, therefor.

Signed and Sealed this

Twenty-sixth Day of August, 2008

JON W. DUDAS
*Director of the United States Patent and Trademark Office*